United States Patent [19]
Tanaka et al.

[11] Patent Number: 6,083,405
[45] Date of Patent: Jul. 4, 2000

[54] FLOATING WATER PURIFICATION FREE-RUNNING APPARATUS AND WATER PURIFICATION METHOD

[75] Inventors: Ryo Tanaka; Katsuhisa Kimata; Yasuo Sajika, all of Tokyo, Japan

[73] Assignee: Nippon Telegraphand Telephone Corporation, Japan

[21] Appl. No.: 09/233,667

[22] Filed: Jan. 19, 1999

[30] Foreign Application Priority Data

Jan. 23, 1998 [JP] Japan .................................. 10-011858

[51] Int. Cl.[7] ...................................................... C02F 1/74
[52] U.S. Cl. ........................ 210/739; 210/758; 210/170; 210/242.2; 261/120
[58] Field of Search ..................................... 210/660, 739, 210/758, 103, 143, 198.1, 242.1, 242.2, 170; 261/120; 441/21

[56] References Cited

U.S. PATENT DOCUMENTS

| | | |
|---|---|---|
| 3,505,213 | 4/1970 | Anthony et al. . |
| 4,086,306 | 4/1978 | Yoshinga .................................. 210/219 |
| 4,680,148 | 7/1987 | Arbisi et al. ............................. 261/120 |
| 4,906,359 | 3/1990 | Cox, Jr. .................................... 210/170 |
| 5,893,978 | 4/1999 | Yoda et al. ............................... 210/747 |

FOREIGN PATENT DOCUMENTS

| | | |
|---|---|---|
| 0 142 720 | 5/1985 | European Pat. Off. . |
| 866966 | 9/1978 | France . |
| 295 07 659 U | 5/1995 | Germany . |
| 62-262933 | 11/1987 | Japan . |
| 5084498 | 4/1993 | Japan . |
| 5085467 | 4/1993 | Japan . |
| 7290093 | 11/1995 | Japan . |
| 8002479 | 1/1996 | Japan . |
| 8252571 | 10/1996 | Japan . |
| 9029231 | 2/1997 | Japan . |
| 10-5509 | 1/1998 | Japan . |
| 2236103 | 3/1991 | United Kingdom . |

OTHER PUBLICATIONS

Patent Abstracts of Japan, vol. 097, No. 002, Feb. 28, 1997.
Abstract of an atricle of "The Muroran Minpo, Nov. 12, 1997" Solar Powered Water Purification System, newly designed by Ebara Kankyo Techno Hokkaido, to be installed in Tokyo, Dec. 1997.

*Primary Examiner*—David A. Simmons
*Assistant Examiner*—Frank M. Lawrence
*Attorney, Agent, or Firm*—Blakely Sokoloff Taylor & Zafman

[57] ABSTRACT

A floating water purification free-running apparatus includes a floating structure, a water purification section, second pumps, a drain outlet, a free-running section, a water quality sensor, a solar cell, an inverter, a sunshine recorder, and a controller. The floating structure is set afloat in a water area. The water purification section filters water in the water area by first pumps. The second pumps inject air into the water area. The drain outlet communicates with the water purification section to drain treated water. The free-running section moves the floating structure in the water area on the basis of a drain injection pressure from the drain outlet. The water quality sensor detects water quality in the water area. The solar cell receives sunlight to generate power. The inverter converts the power into an AC voltage and applies it to each pump. The sunshine recorder measures a sunshine intensity. The controller operates on the basis of the power generated by the solar cell, and controls the number of pumps to be driven in accordance with at least one of sunshine intensity information from the sunshine recorder and the AC voltage and output frequency of the inverter when making the water purification section perform water purification on the basis of an output from the water quality sensor.

17 Claims, 10 Drawing Sheets

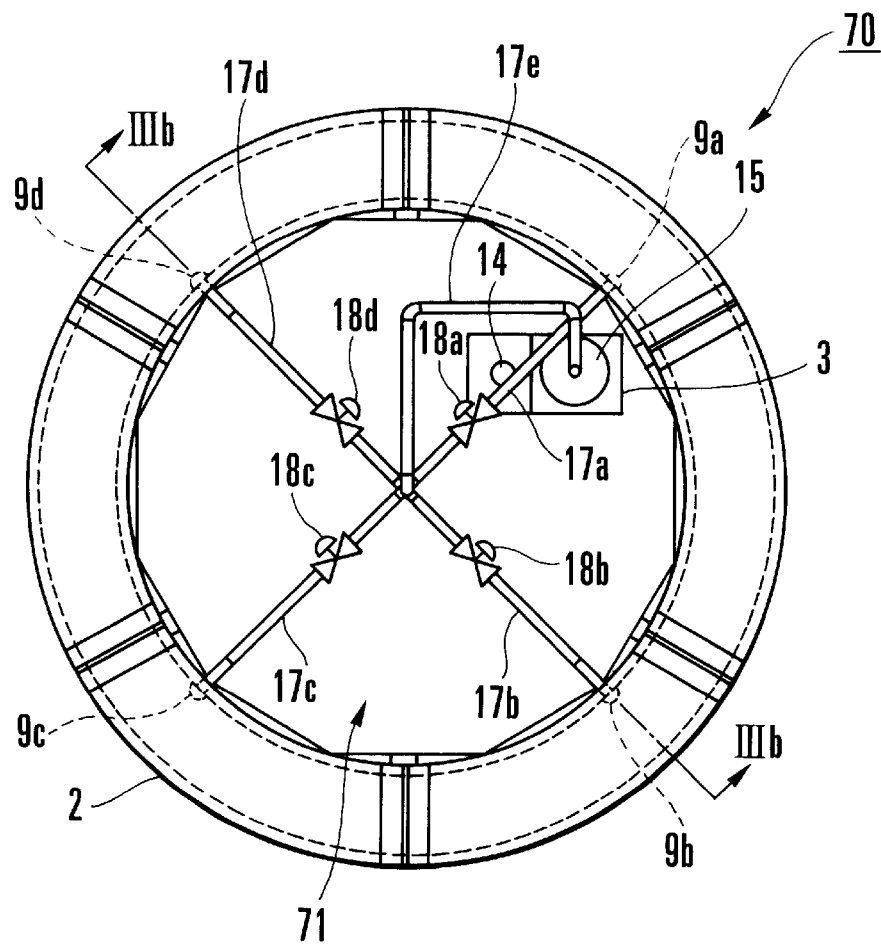
F I G. 3 A
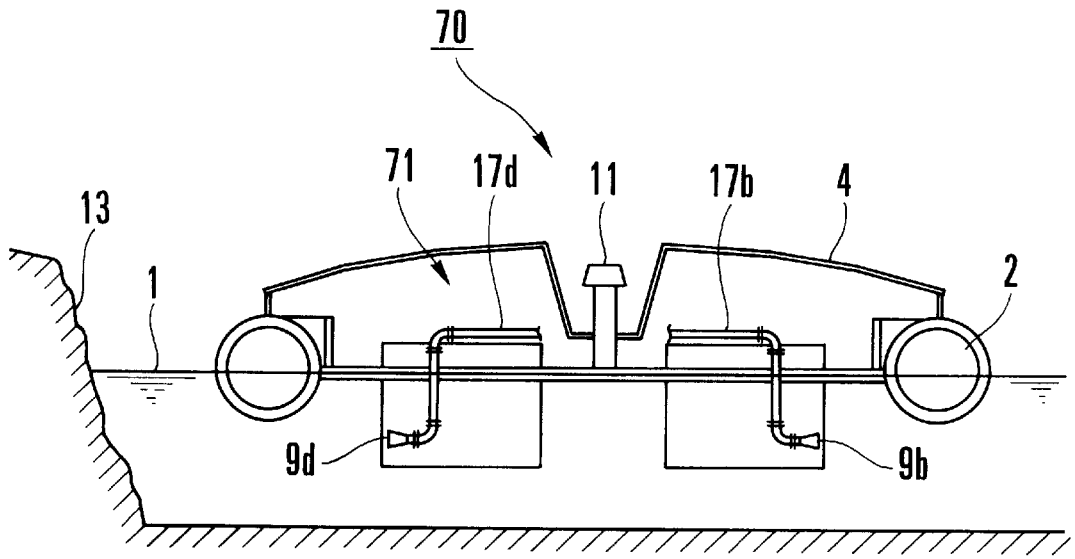
F I G. 3 B

FLOATING WATER PURIFICATION FREE-RUNNING APPARATUS AND WATER PURIFICATION METHOD

BACKGROUND OF THE INVENTION

The present invention relates to a floating water purification free-running apparatus and method of causing a water purification apparatus designed to move on water and mounted on a floating structure to travel on water areas such as rivers, streams, ponds, and marshes by effectively using drain pressure energy or air-water mixture injection pressure energy obtained after water purification.

In water areas such as rivers, streams, ponds, and marshes, suspended solids tend to be generated in areas where water scarcely runs, resulting in a deterioration in water quality. Conventionally, in such a water area, a water purification apparatus is fixed to the periphery of the area to practice a water purification method of forcibly causing convection of surface water and bottom water by an aeration process, a circulating pump, and the like.

A conventional circulatory water purification apparatus will be described below with reference to FIG. 11. As shown in FIG. 11, a water purification apparatus 82 purifies the water drawn up from the surface layer of a water area 1 by a lift pump 81 fixed to the shore of the water area 1 to obtain purified water, and the purified water is supplied, through a long water supply pipe 83 laid on the bottom of the water, to a floating structure 80 fixed in a purification target water area of the water area 1 (to which the purified water is to be supplied) with a mooring unit 84.

The purified water is pressurized by a pump 85 to inject a fountain of water 87 through a fountain unit 86 on the floating structure 80 to increase the amount of oxygen dissolved in the water in the water area 1 around the floating structure 80. When this apparatus is used, the water area where water purification can be performed is expanded by increasing the length of the water supply pipe 83 or the capacity of the lift pump 81.

According to the conventional water purification apparatus 82, however, since the apparatus 82 is fixed, increases in the length of the water supply pipe 83 and the capacity of the lift pump 81 lead to an increase in apparatus size. This increases the total cost including equipment investment, maintenance cost, and the like.

In addition, since this apparatus is essentially an apparatus designed to consume large amount of electric power, an increase in power consumption with the above increase in apparatus size inevitably demands facilities that can supply a large amount of electric power, and the driving power supply to be used is limited to one with a large size. For this reason, it is difficult to use a solar cell that is a clean power supply as a driving power supply because of its low energy density per unit area. This hinders the effective use of clean energy.

Furthermore, since the conventional water purification apparatus is of a stationary type, only the peripheral area of a predetermined target water area can be expanded, but the water area where water purification can be performed cannot be moved. For this reason, this apparatus is not suitable for water purification throughout a large water area. Conventionally, water purification is performed in only a predetermined water area where water purification can be performed, but no water purification is performed in other water areas. To perform water purification in other water areas, additional apparatuses must be installed.

Moreover, this apparatus cannot flexibly cope with the generation of a local water area whose water quality has accidentally deteriorated owing to the influence of wind, a change in water temperature, an artificial factor, or the like.

SUMMARY OF THE INVENTION

It is the first object of the present invention to improve the efficiency of water purification without increasing the apparatus size.

It is the second object of the present invention to save driving energy for the apparatus and realize effective use of energy.

It is the third object of the present invention to purify an entire water area.

In order to achieve the above objects, there is provided a floating water purification free-running apparatus comprising a floating structure floating in a water area, a water purification section which is mounted on the floating structure and filters water in the water area by using at least one of a plurality of first pumps, a plurality of second pumps for injecting air into the water area, a water purification section for adsorbing phosphorus contained in water in the water area by using at least one of a plurality of third pumps, a drain outlet which communicates with the water purification section to drain treated water purified by the water purification section, a free-running section for moving the floating structure on the water area on the basis of a drain injection pressure from the drain outlet, a water quality sensor which is provided as a measuring section to detect water quality in the water area, a solar cell which is formed on an upper portion of the floating structure and receive sunlight to generate power, an inverter for converting the power generated by the solar cell into an AC voltage and applying the voltage as driving power to each pump, a sunshine recorder for measuring a sunshine intensity of sunlight, and a controller which is mounted on the floating structure, operates on the basis of the power generated by the solar cell, and controls the number of pumps to be driven on the basis of at least one of sunshine intensity information from the sunshine recorder and the AC voltage and output frequency of the inverter when making the water purification section perform water purification on the basis of an output from the water quality sensor.

There is provided a water purification method comprising the steps of driving a predetermined pump with a first priority when a sunshine intensity measured by the sunshine recorder becomes not less than a predetermined value, sequentially driving the pumps in accordance with a predetermined priority order when an output frequency of the inverter is not less than a first value after the pump with the first priority is driven, keeping driving each pump that has already been driven when the output frequency of the inverter is not more than the first value and not less than a second value, and sequentially stopping the pumps in operation in accordance with the priority order when the output frequency of the inverter becomes not more than the second value.

BRIEF DESCRIPTION OF THE DRAWINGS

FIG. 3A is a plan view showing an internal pipe arrangement and the positions of drain outlets in the apparatus;

FIG. 3B is a sectional view taken along a line IIIb—IIIb of the apparatus in FIG. 3A;

DESCRIPTION OF THE PREFERRED EMBODIMENT

An apparatus according to an embodiment of the present invention will be described below with reference to FIGS. 1 and 2.

First Arrangement

Figure 1:
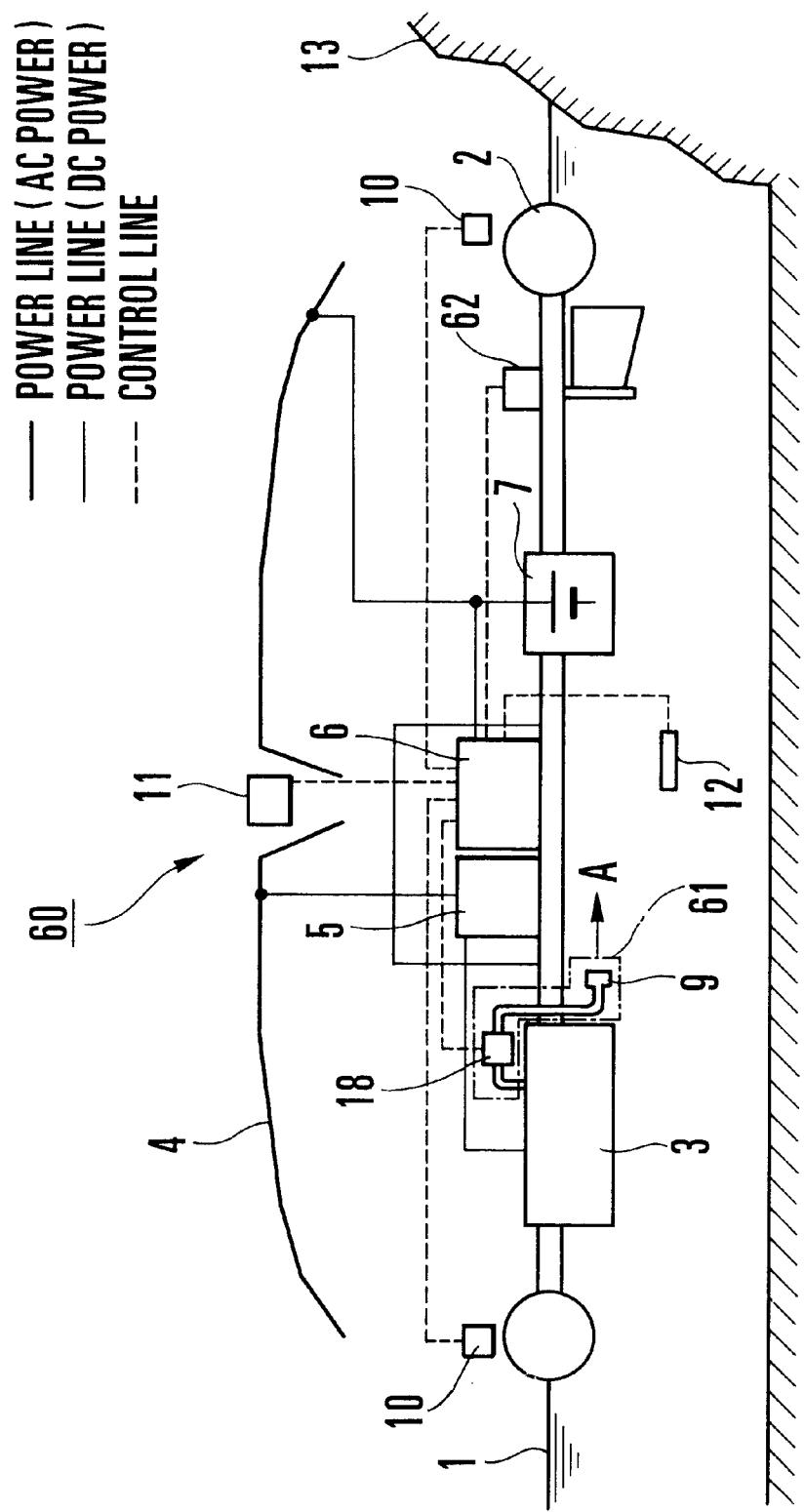
FIG. 1 is a schematic sectional view of a floating water purification free-running apparatus according to the present invention.

FIG. 1 shows a floating water purification free-running apparatus as the first arrangement which is installed on water. FIG. 2 explains how a water purification section performs an algae pressurization process for decreasing the propagation of algae in a water area 1 by applying a water pressure on the algae.

A floating water purification free-running apparatus 60 as the first arrangement is floating on the water area 1 as a purification target. The floating water purification free-running apparatus 60 includes a floating structure 2 as a base member that is set afloat in water, a water purification section 3 for purifying water, a solar cell 4 for supplying DC power generated by sunlight, a power converter 5 for converting the DC power into AC power, a controller 6 for controlling the respective sections, and a battery 7 for storing power from the solar cell 4 and performing auxiliary power supply.

This apparatus also includes a solenoid valve 18 that directly communicates with the water purification section 3 and adjusts the flow rate of water drained therefrom, a drain outlet 9 that drains water to obtain a propellant force A, and a steering section 62, which constitute a free-running section. The apparatus further includes an infrared sensor 10 for detecting an obstacle in the water area 1 and a slope face 13 of the water area 1, an azimuth measuring device 11 for measuring an azimuth, and a water quality sensor 12 for measuring the water quality of the water area 1, which constitute a measuring section for environments and the like.

Figure 9:
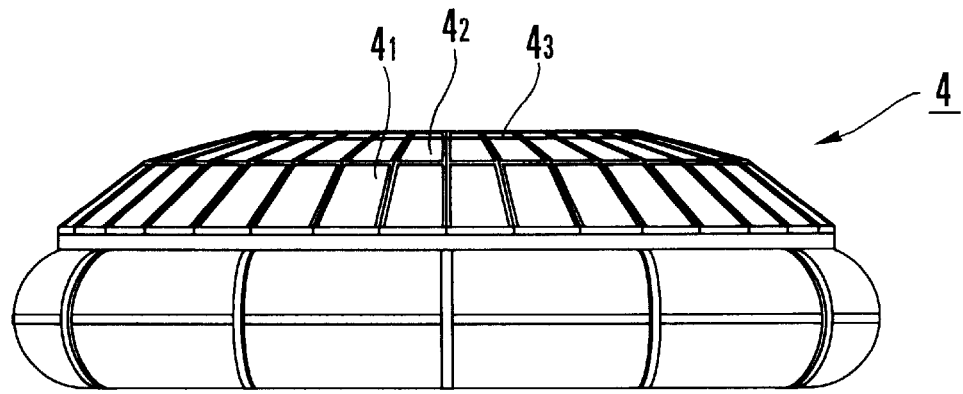
FIG. 9 is a perspective view showing the shape of a solar cell.

The solar cell 4 of the floating water purification free-running apparatus 60 is mounted on the floating structure 2 such that units $4_1, 4_2, 4_3, \ldots, 4_n$ constitute a polyhedron, as shown in FIG. 9.

Since the solar cell 4 is mounted in the form of a polyhedron, sunlight can be efficiently converted to the electricity for the floating water purification free-running apparatus 60 regardless of its position. This solar cell mounting also makes it possible to convert the sunlight to electricity regardless of the position of the sun with time and seasons. There is therefore no need to control the attitude of the solar cell 4 to efficiently take sunlight into the apparatus at all times. This saves the power for attitude control, and produces an effect especially in strong winds and the like. Owing to the above method of mounting the solar cell 4 in the form of a polyhedron, the destruction of the apparatus can be prevented even in strong winds as in a typhoon.

Figure 2:
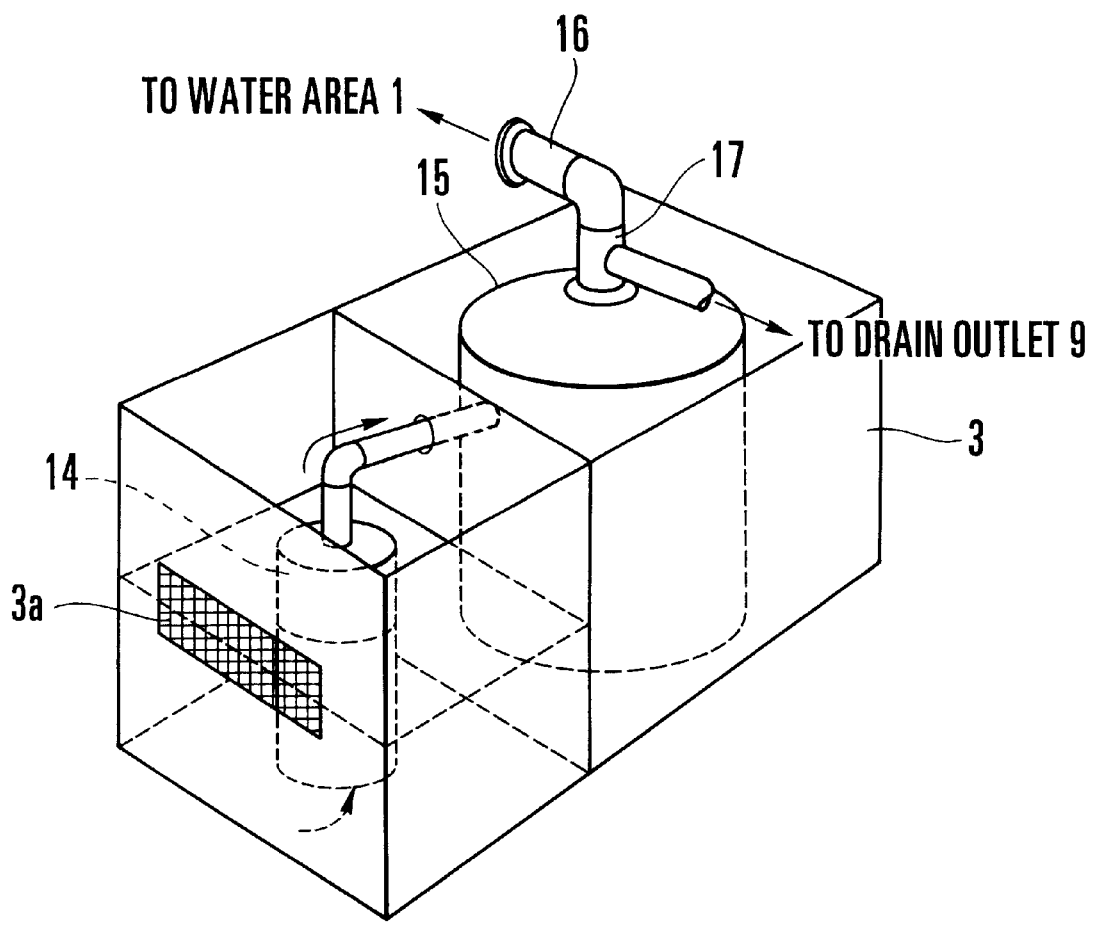
FIG. 2 is an enlarged perspective view of a water purification section of the apparatus.

FIG. 2 shows how the water purification section 3 performs an algae pressurization process. The water purification section 3 includes an intake 3a through which water in the water area 1 is taken, a pressure pump 14 for performing an algae pressurization process for the taken water, a tank 15 for storing the pressurized water, a water distribution pipe 16 for supplying water to a process, e.g., injecting water over the water area 1, and a branch pipe 17 for causing the water distribution pipe 16 to branch to the drain outlet 9.

In addition to the above algae pressurization process, the water purification section 3 performs an aeration process, filtration process, phosphorus adsorption process, and the like. Since means for performing such processes are generally arranged in the water purification section 3, an illustration thereof is omitted from FIG. 2. In addition, a mechanism for discharging treated water by, for example, injecting the water from the water distribution pipe 16 to the water area 1 is not shown in FIG. 2.

First Method

This method is a free-running method for the floating water purification free-running apparatus corresponding to the first arrangement described above. The method will be described with reference to FIGS. 1 and 2.

In this method, the floating water purification free-running apparatus 60 is set afloat in a purification target water area in the water area 1 by the application of the floating structure 2. The solar cell 4 and the auxiliary battery 7 are used as DC power supplies. The power converter 5 converts DC power into AC power suitable for the water purification section 3, and supplies the AC power.

Since the battery 7 is used as an auxiliary power supply in addition to the solar cell 4, the driving hours of the floating water purification free-running apparatus 60 are not limited to sunshine hours. This apparatus can also be driven in the time during which sunlight is weak. In sunshine hours, surplus power can be stored in the battery, realizing effective use of energy.

The water purification section 3 takes water from the purification target water area, performs water purification for the water, and injects the water from the drain outlet 9 by adjusting the flow rate of water with the solenoid valve 18, thereby obtaining the propellant force A. As a result, a force acts on the floating water purification free-running apparatus 60 in the opposite direction to the propellant force A due to a reaction of the propellant force A. The apparatus then runs by itself using this force as a driving force.

The controller 6 controls the solenoid valve 18, the infrared sensor 10, the azimuth measuring device 11, and the water quality sensor 12. More specifically, the controller 6 opens/closes the solenoid valve 18 to control the free-running speed of the floating water purification free-running apparatus 60, and detects an obstacle in the water area 1 and the slope face 13 by using the infrared sensor 10. The controller 6 also controls the steering section 62 by detecting the direction of the floating water purification free-running apparatus 60. In addition, the controller 6 measures the degree of water purification by detecting the output from the water quality sensor 12.

First of all, the floating water purification free-running apparatus 60 determines a purification target water area, sails to the target water area, and performs water purification. If the floating water purification free-running apparatus 60 determines on the basis of the output from the water quality sensor 12 that water purification in the target water area is complete, the apparatus makes the water purification section 3 continuously perform water purification and discharge the treated water from the drain outlet 9 to ensure a driving force for movement to the next purification target water area. Meanwhile, the apparatus checks the current azimuth with the azimuth measuring device 11, and drives a free-running section 61 and the steering section 62 to change the direction, thereby moving to the next purification target water area. In this movement, the apparatus avoids obstacles and the slope face 13 by detecting the outputs from the infrared sensor 10. The direction of the apparatus may be changed by using, for example, a device for changing the direction of the drain outlet 9 instead of the steering section 62.

With the above operation, the floating water purification free-running apparatus 60 can travel by itself and move, at an arbitrary speed, from the purification target water area where water purification is complete, while avoiding obstacles and the slope face 13.

As a water purification method, an algae pressurization process, aeration process, filtration process, phosphorus absorption process, or the like is widely used. In any of these processes, water in a water area is taken by driving a pump, and the treated water is directly discharged into the water area. Each process can be applied to the free-running method as the first method. FIG. 2 shows how the water purification section 3 performs the algae pressurization process.

The above algae pressurization process will be described with reference to FIG. 2.

Water in a purification target water area is taken into the tank 15 through the intake 3a and the pressure pump 14. In the algae pressurization process, the reproductive power of algae is reduced by the pressurization to purify the water. The treated water is discharged over the water area 1 in the form of a fountain of water or the like through the water distribution pipe 16 as in the prior art. In addition to this discharging process, the drain energy is used as secondary energy to obtain the propellant force A from the drain outlet 9 through the branch pipe 17 so as to inject the water. With the reaction force of this injection force, the floating water purification free-running apparatus 60 can run by itself. That is, water in the water area 1 is pressurized in the algae pressurization process, and the resultant force is stored as water energy, and the stored water energy is used to allow the floating water purification free-running apparatus 60 to run by itself.

In this case, if the pressurized water is discharged vertically to give no driving force to the floating water purification free-running apparatus 60, the apparatus can stay in a predetermined water area and effectively perform water purification therein.

When the above algae pressurization process is used, the propellant force increases owing to the pressurization, and hence, there is no need to add a pump for obtaining a large propellant force. That is, the pressurized water can be used as it is. Any of the remaining processes can be used together with this process. When the aeration process is to be used, an ejector type aeration pump is installed in the water purification section 3. This aeration pump is used to inject an air-water mixture from the outlet at a position about 1 m below the water surface. The free-running section can therefore use the discharging energy of this air-water mixture as a driving force.

Since the floating water purification free-running apparatus 60 can run by itself as in this method, the purification target water area can be arbitrarily changed by movement of the apparatus, thus effectively performing water purification throughout the water area. With this method, there is no need to increase the apparatus size, and hence the power consumption can be reduced. This allows the apparatus to use a solar cell, which has a low power supply efficiency per unit area, as a clean power supply. Since the solar cell is used as a power supply, and the apparatus runs by itself using the above drain energy as the secondary energy, effective use of energy is realized. Furthermore, the apparatus can freely move and flexibly cope with the occurrence of a deterioration in water quality in a local water area due to the influence of wind, a change in water temperature, an artificial factor, or the like. In addition, the movement of the floating water purification free-running apparatus 60 can prevent the apparatus from always blocking sunlight on a water area under the apparatus and also prevent from performing water purification in only a specific water area. Therefore, the apparatus does not disturb the ecosystem in the water area 1, and restoration of the normal ecosystem can be expected.

Second Arrangement

The second arrangement is designed on the basis of the fundamental principle of the first arrangement. The basic portion of this arrangement is common to that of the first arrangement, and a free-running section 71 is obtained by improving the mechanism of the free-running section 61 in FIG. 1. A description of the common portion will be omitted.

Figure 4A:
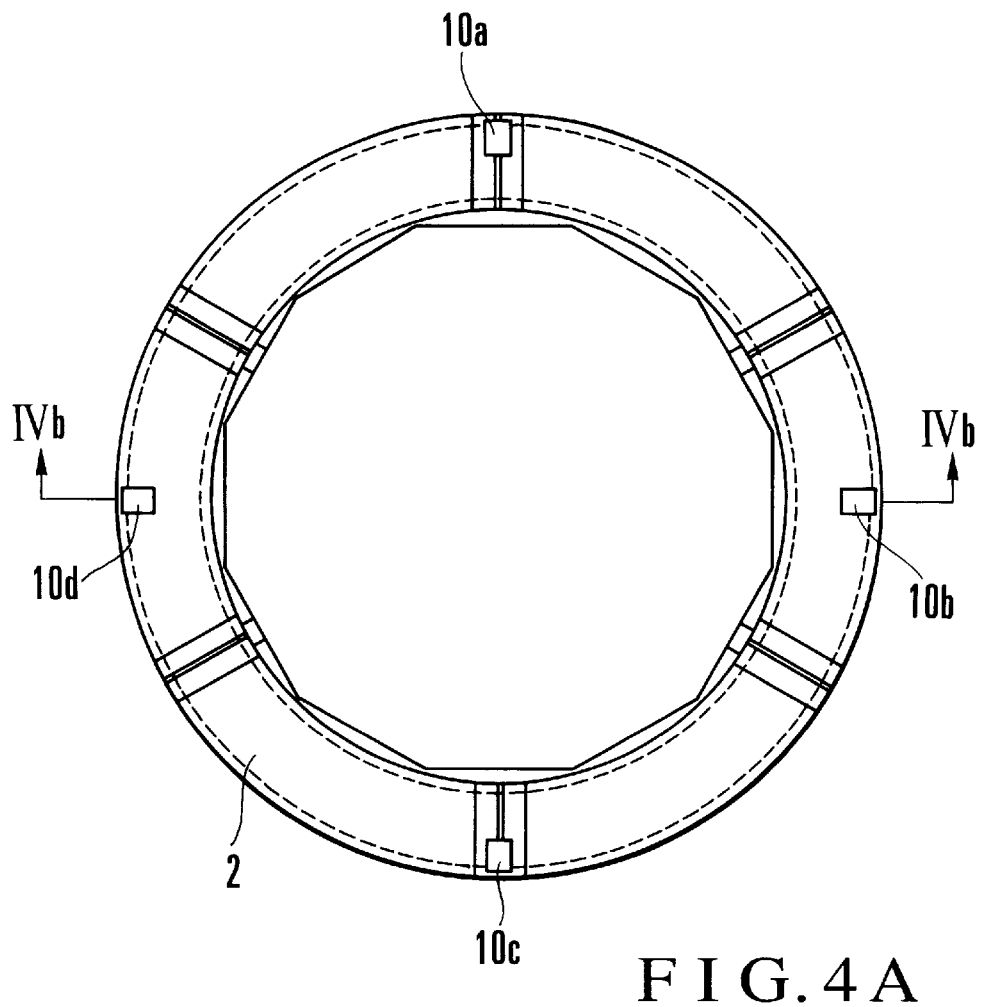
FIG. 4A is a plan view showing the installation positions of infrared sensors.
Figure 4B:
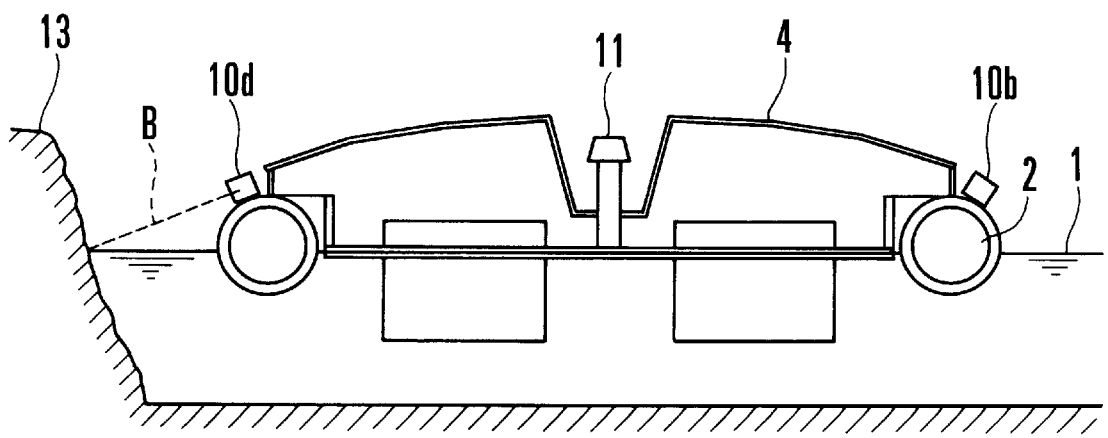
FIG. 4B is a sectional view taken along a line IVb—IVb of the apparatus in FIG. 4A.

FIGS. 3A and 3B show an internal pipe arrangement and the positions of outlets in the second arrangement. FIGS. 4A and 4B show the installation positions of infrared sensors.

Referring to FIGS. 3A and 3B, a floating water purification free-running apparatus 70 as the first arrangement includes a circular floating structure 2, a water purification section 3, a pressure pump 14 and tank 15 in the water purification section 3, an azimuth measuring device 11 for measuring the current azimuth and a reference azimuth, four branch pipes 17a, 17b, 17c, and 17d extending from the center of the floating structure 2 in radial directions at 90°-intervals in one plane with the central angles being set at π/2-intervals, outlets 9a, 9b, 9c, and 9d formed in the outer ends of the branch pipes 17a, 17b, 17c, and 17d through which water is injected in the radial directions in a water area 1, a branch pipe 17e for coupling the tank 15 to the convergent inner ends of the branch pipes 17a, 17b, 17c, and 17d, and solenoid valves 18a, 18b, 18c, and 18d for controlling the flow rates of water in the branch pipes 17a, 17b, 17c, and 17d. Such valves with simple mechanisms and high reliability, e.g., ball valves, are enough for the solenoid valves 18a to 18d.

In addition to the above components, this apparatus includes infrared sensors 10a, 10b, 10c, and 10d arranged on the outer periphery of the floating structure 2 at 90°-intervals with the central angles being shifted from the branch pipes 17a, 17b, 17c, and 17d by π/4. The apparatus also includes a GPS signal receiver 52 in FIG. 6 (to be described later) which receives a GPS signal (not shown) and detects the position, the azimuth measuring device (gyro sensor) 11 for detecting a change in azimuth, and a speedometer 51 in FIG. 6 (to be described later) which detects the speed.

This apparatus has a controller 6 for controlling the GPS signal receiver 52 and the speedometer 51 as well as the infrared sensors 10a, 10b, 10c, and 10d, the solenoid valves 18a, 18b, 18c, and 18d, the azimuth measuring device 11, and a water quality sensor 12. The controller 6 includes a CPU (computer) 6A (to be described later) equipped with programs for operation procedures for the respective components.

The infrared sensors, the outlets, the branch pipes, and the solenoid valves are not limited to four, and four or more each of these components may be installed. As in the first arrangement, a mechanism for discharging treated water by, for example, injecting it into the water area 1 is not shown in FIGS. 3A, 3B, 4A, and 4B.

Second Method

The second method is a free-running method for the floating water purification free-running apparatus corresponding to the second arrangement. This method will be described with reference to FIGS. 5A and 5B in addition to FIGS. 3A, 3B, 4A, and 4B.

Referring to FIGS. 3A, 3B, 4A, and 4B, to purify water in a purification target water area in the water area 1, the water purification section 3 takes water from the water area 1 and performs an algae pressurization process. This pressurized water is supplied to the branch pipes 17a, 17b, 17c, and 17d branching in the four radial directions through the branch pipe 17e and is injected/discharged from the outlets 9a, 9b, 9c, and 9d. The reaction forces of the propellant forces act on the floating water purification free-running apparatus 70. Owing to the generation of the reaction forces in the respective directions, the floating water purification free-running apparatus 70 moves.

The amounts of water injected from the outlets 9a, 9b, 9c, and 9d are respectively controlled by the solenoid valves 18a, 18b, 18c, and 18d. The apparatus can be easily moved in any direction by selectively supplying water in the directions of the branch pipes 17a, 17b, 17c, and 17d and adjusting the amounts of water injected. In addition, when a propellant force is exerted in the moving direction, a reaction force acts in the opposite direction to the moving direction. With this operation, the apparatus can be controlled to, for example, quickly stop and turn around. This shortens the time required for the movement.

Infrared rays B are output from the infrared sensors 10a, 10b, 10c, and 10d arranged on the outer periphery of the floating structure 2 in the four radial directions, and a reflected wave is received to detect information about an obstacle on the water area 1 or the slope face 13, thereby controlling the movement of the floating water purification free-running apparatus 70 to prevent the apparatus from colliding with or running into the obstacle or the slope face 13. Note that an arbitrary detection distance can be set by adjusting the directions and the like of the infrared rays B. The azimuth measuring device 11 measures azimuth information about the azimuth and reference azimuth of the floating water purification free-running apparatus 70. The GPS signal receiver 52 (to be described later) measures position information. The speedometer (speed sensor) 51 measures speed information. The water quality sensor 12 measures the degree of water purification.

On the basis of the above information about obstacles and the like, azimuth information, position information, speed information, and water purification degree information, this apparatus is moved on a specific route or to a water area suffering from a deterioration in water quality while collisions with obstacles and the like are prevented in the following manner. The CPU 6A of the controller 6 equipped with such movement control programs executes the programs to calculate the length and direction of the movement. The apparatus is moved on the basis of the calculation results.

The above sailing method will be described in detail next with reference to FIGS. 5A and 5B.

Figure 5A:
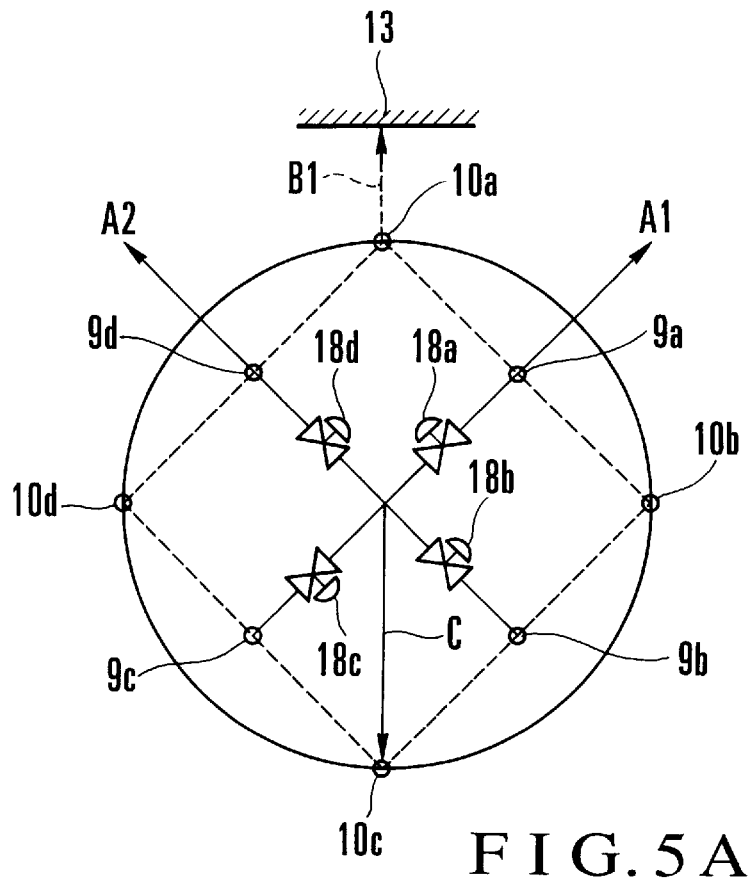
FIG. 5A is a view showing how each component in the apparatus operates when an obstacle or the like is detected.
Figure 5B:
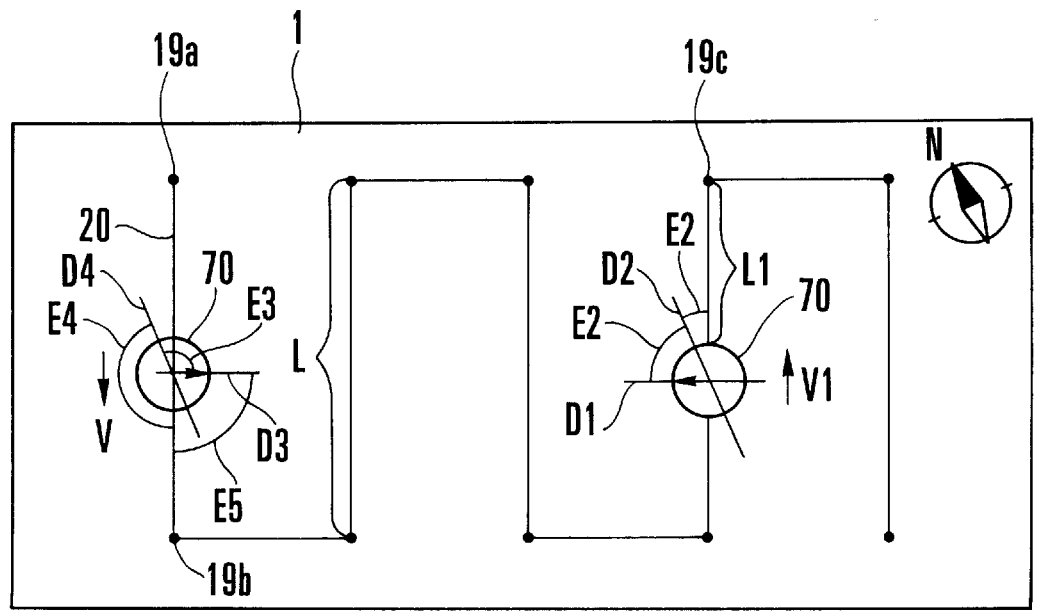
FIG. 5B is a view showing the sailing path of the apparatus under sailing control.

FIG. 5A shows how each component of the floating water purification free-running apparatus 70 operates when an obstacle or the like is detected. FIG. 5B shows the path of the floating water purification free-running apparatus 70 under sailing control.

An operation to be performed when the infrared sensor 10a detects the slope face 13 in the water area 1 will be described with reference to FIG. 5A. When the slope face 13 is detected on the basis of an infrared ray B1 from the infrared sensor 10a, the solenoid valves 18a and 18d are opened, and the solenoid valves 18b and 18c are closed. The treated water pressurized in the tank 15 is injected from the outlets 9a and 9d into the water through the solenoid valves 18a and 18d.

The following is a table indicating the corresponding operations of the respective components.

TABLE 1

| Signal | Sensor | State | Operation | Propellant Force | Driving Force |
|---|---|---|---|---|---|
| 10a | on | | | | |
| 18a | | on | | | |
| 18b | | off | | | |
| 18c | | off | | | |
| 18d | | on | | | |
| 9a | | | injection | A1 | |
| 9b | | | none | | reaction = C |
| 9c | | | none | | |
| 9d | | | injection | A2 | |

Propellant forces A1 and A2 are generated, and a driving force for the floating water purification free-running apparatus 70 is obtained from a synthetic force C of the reaction forces of the propellant forces A1 and A2. The apparatus can therefore move without colliding with or running into an obstacle in the water area 1 or the slope face 13.

Sailing control on the apparatus in the water area 1 will be described with reference to the right half of FIG. 5B. Upon reception of a position signal from a GPS satellite through the GPS signal receiver, the floating water purification free-running apparatus 70 calculates the time required for movement from the current position to a target coordinate point 19b on the basis of a difference distance L1 to a target coordinate point 19c and a moving distance V1 per unit time which is obtained from the speed sensor. To cause the apparatus to sail to the target coordinate point 19b, the opening/closing ratios and times of the solenoid valves 18a, 18b, 18c, and 18d are automatically determined by the control program on the basis of an angle E1 defined by a current azimuth D1 of the floating water purification free-running apparatus 70 and a reference azimuth D2 and an angle E2 defined by the reference azimuth D2 and the target coordinate point 19b.

A case wherein a sailing route 20 is determined in advance, and the apparatus is to move from a coordinate point 19a to the coordinate point 19b on the route 20 will be described with reference to the left half of FIG. 5B. The time required for movement is calculated from a moving distance V per unit time and an inter-coordinate moving distance L according to the following equation. Note that the time required for movement is also calculated from the distance L1 and the moving distance V1 per unit time by using the same equation.

time for movement [h]=inter-coordinate distance L[m]/moving distance V per unit time [m/h]

The opening/closing ratios and times of the solenoid valves 18a, 18b, 18c, and 18d are automatically determined by the control program on the basis of a current azimuth D3, a reference azimuth D4, an angle E3 defined by the current azimuth D3 and the reference azimuth D4, an angle E4 defined by the coordinate point 19b and the reference azimuth D4, and a difference angle ES between the angles E3 and E4.

Assume that a water area suffering from a deterioration in water quality is preferentially selected, and the apparatus is made to sail in the selected area. In this case, a management value as a reference is set with respect to water quality data measured by the water quality sensor 12 capable of measuring water quality in real time. When a deviation from this management value is detected, the apparatus is stopped until the water quality data falls within the management value. If the water quality data falls within the management value, the apparatus may keep moving.

In the above sailing control, effects such as inertial forces, e.g., acceleration and deceleration, a rotating motion, and an inertial motion may be produced as well as external forces produced by winds, waves, and the like. Taking these effects into consideration, the apparatus is equipped with a program for timely controlling adjustment of the moving path by using the position information, azimuth change information from the azimuth measuring device 11, and the speed information.

Third Arrangement

Figure 6:
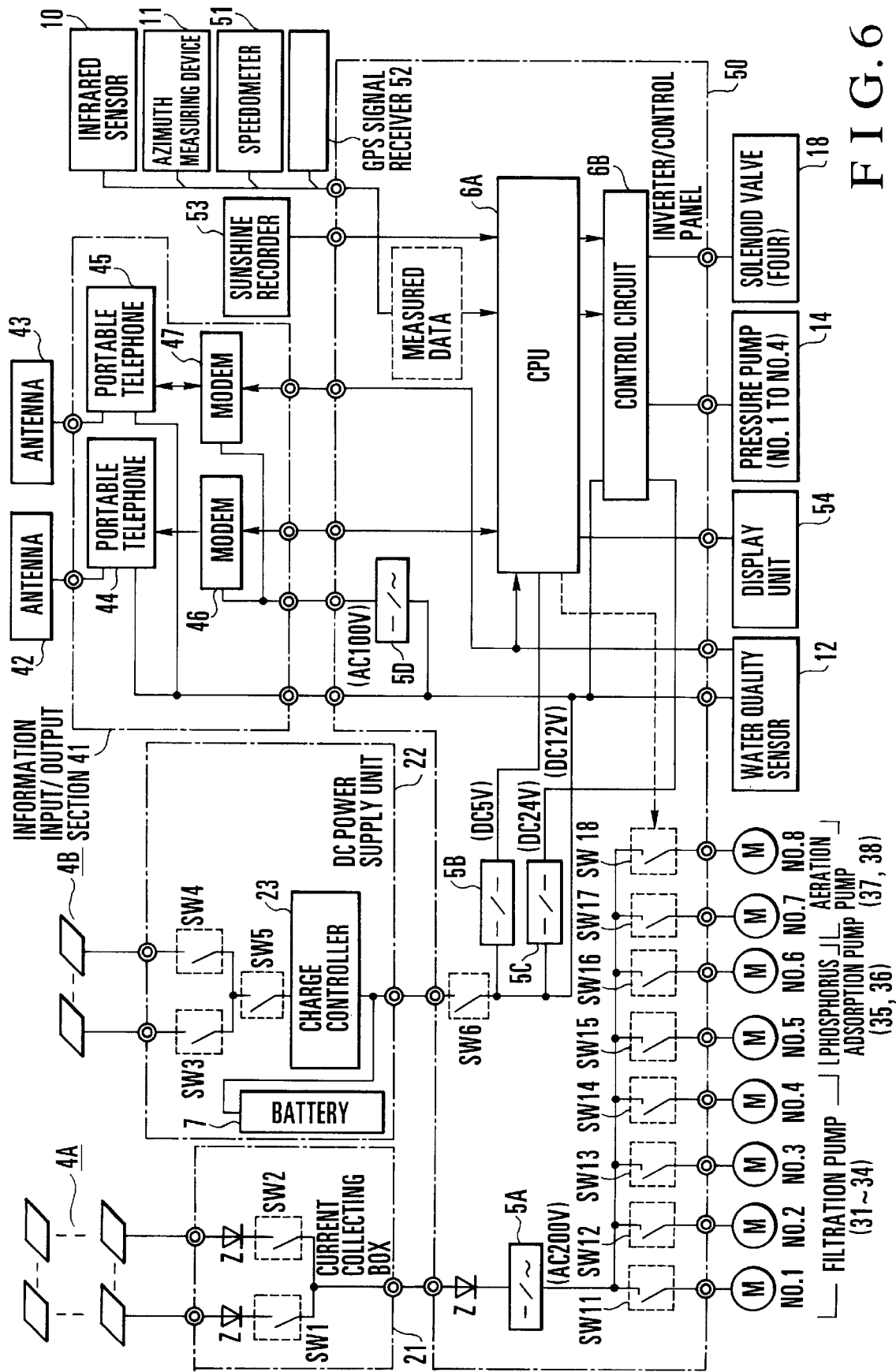
FIG. 6 is a block diagram showing a control system of the apparatus.

FIG. 6 shows the third arrangement of the floating water purification free-running apparatus.

Referring to FIG. 6, power generated by a module 4A of a solar cell 4 is rectified by a rectifier Z in a current collecting box 21. The rectified power is supplied as DC power to an inverter/control panel 50 through closed switches SW1 and SW2. The DC power from this module 4A is further rectified by a rectifier Z in the inverter/control panel 50. The rectified power is converted into an AC power of 200 V by an inverter 5A of a power converter 5. This power is then supplied as driving power to motors M through switches SW11 to SW18.

Four filtration pumps 31 to 34 for filtrating water taken through intakes are respectively driven by four motors (M) NO. 1 to NO. 4. Two phosphorus adsorption pumps 35 and 36 for removing phosphorus from water taken through the intakes are respectively driven by two motors (M) NO. 5 and NO. 6. Two aeration pumps 37 and 38 for discharging air into water are respectively driven by two motors (M) NO. 7 and NO. 8.

A CPU 6A of the controller 6 performs opening/closing control on the switches SW11 to SW18, each for applying a voltage of 200 V from the inverter 5A to a corresponding one of the motors M.

Power generated by a module 4B of the solar cell 4 is supplied to a charge controller 23 through switches SW3 to SW5 in a DC power supply unit 22. Upon reception of the power generated by the module 4B, the charge controller 23 charges a battery 7 with this power. A DC voltage of 12 V from the module 4B, which is converted by the charge controller 23, or a DC voltage of 12 V from the battery 7 is applied to the inverter/control panel 50.

This DC power of 12 V is supplied as input power to inverters 5B, 5C, and 5D through a switch SW6 in the inverter/control panel 50 and to the CPU 6A side of a control circuit 6B of the controller 6. In addition, this power is supplied to a water quality sensor 12, an infrared sensor 10, and portable telephones 44 and 45 in an information input/output section 41.

In this case, upon reception of the DC voltage of 12 V, the inverter 5B converts the voltage into a DC voltage of 5 V, and applies it to the CPU 6A. Upon reception of the DC voltage of 12 V, the inverter SC converts the voltage into a DC voltage of 24 V, and applies it as output-side power to the control circuit 6B. In this case, the control circuit 6B drives four pressure pumps 14 and four solenoid valves 18 which are used to control the pressures of the four filtration pumps 31 to 34 by using the supplied power. Upon reception of the DC voltage of 12 V, the inverter SD converts the voltage into an AC voltage of 100 V, and applies it as power to modems 46 and 47 of the information input/output section 41.

When the CPU 6A determines on the basis of water quality data from the water quality sensor 12 that the water is polluted, the CPU 6A drives the respective motors to operate the filtration pumps 31 to 34, the phosphorus adsorption pumps 35 and 36, the aeration pumps 37 and 38, and the like so as to perform a filtration process, a phosphorus adsorption process, an aeration process, and the like, as described above. Upon determining that water purification is complete, the CPU 6A keeps operating the filtration pumps 31 to 34 to discharge the treated water as a moving force from the drain outlet 9 of the water purification section 3, thereby ensuring the force for movement to the next purification target water area. Meanwhile, the CPU 6A makes the apparatus run by itself to the next purification target water area while avoiding obstacles in the water and a slope face 13 on the basis of measurement data from an azimuth measuring device 11, a speedometer 51, a GPS signal receiver 52, and the infrared sensor 10.

In addition, the CPU 6A communicates information with an external unit through the modem 46, the portable telephone 44, and an antenna 42 of the information input/output section 41. In this case, the external unit can obtain water quality data from the water quality sensor 12 through the model 47, the portable telephone 45, and an antenna 43 of the information input/output section 41. When the external unit outputs a command to perform water purification, the command data is supplied to the CPU 6A through the antenna 42, the portable telephone 44, and the modem 46. In this case, the CPU 6A closes one of the switches SW11 to SW18 to apply an AC voltage of 200 V from the inverter 5A to a corresponding motor, thereby performing a filtration process, a phosphorus adsorption process, an aeration process, or the like.

The CPU 6A is connected to a sunshine recorder 53. The CPU 6A closes one of the switches SW11 to SW18 in accordance with sunshine intensity information from the sunshine recorder 53 to apply an AC voltage of 200 V from the inverter 5A to a corresponding motor, thereby performing a filtration process, a phosphorus adsorption process, an aeration process, or the like.

In the third arrangement, the water area 1 is to be purified, the aeration pumps 37 and 38 are started first for the sake of stable operation of the apparatus. Subsequently, the filtration pumps 31 to 34 are started to perform a filtration process, and the phosphorus adsorption pumps 35 and 36 are started to perform a phosphorus adsorption process.

As described above, when the filtration and phosphorus adsorption processes are performed in this order, a water area 1 can be efficiently purified.

A substance that adsorbs phosphorus is a porous substance (e.g., ferric hydroxide). If water taken through an intake is immediately adsorbed by the phosphorus adsorption substance, pores of the substance are filled with impurities contained in the water, hindering the water from being discharged from the phosphorus adsorption substance to the filtration pump side. For this reason, the impurities contained in the water taken through the intakes are removed first by the filtration pumps 31 to 34, and the filtered water is then supplied to the phosphorus adsorption pumps 35 and 36 to make the phosphorus adsorption substance adsorb phosphorus. After this operation, the water is discharged.

Figure 10:
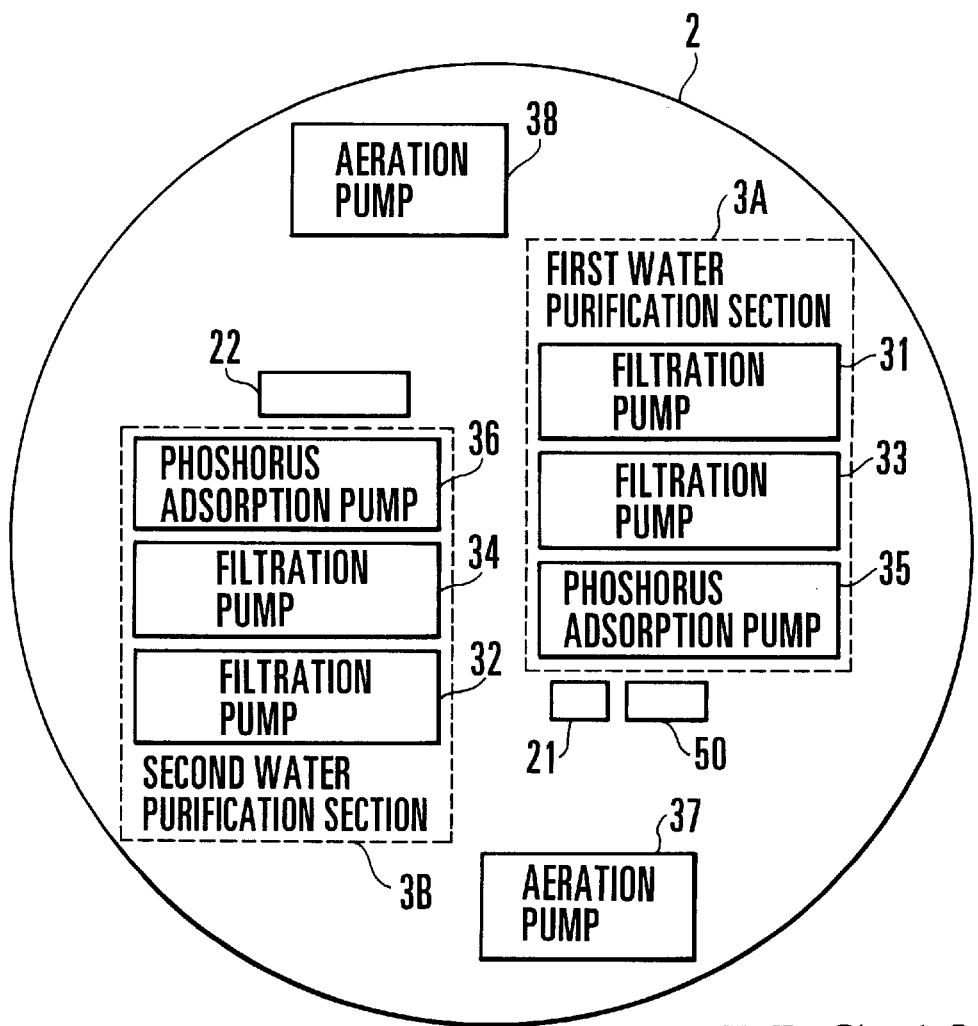
FIG. 10 is a view showing the arrangement of water purification sections.

According to this apparatus, as shown in FIG. 10, the filtration pumps 31 and 33 and the phosphorus adsorption pump 35 constitute a first water purification section 3A, and the filtration pumps 32 and 34 and the phosphorus adsorption pump 36 constitute a second water purification section 3B. Since the water purification section 3 is constituted by the two water purification sections (the first and second water purification sections 3A and 3B), only one of the water purification sections can be operated.

When the first water purification section 3A is operated, impurities contained in water taken through the intake are removed by the filtration pump 31, and the water discharged from the filtration pump 31 is filtered by the filtration pump 33. The filtered water is supplied to the phosphorus adsorption pump 35 to make the phosphorus adsorption substance adsorb phosphorus. The treated water is then discharged into the water area 1.

When the second water purification section 3B is operated, impurities contained in water taken through the intake are removed by the filtration pump 32, and the water discharged from the filtration pump 32 is filtered by the filtration pump 34. The filtered water is supplied to the phosphorus adsorption pump 36 to make the phosphorus adsorption substance adsorb phosphorus. The treated water is then discharged into the water area 1.

When the amount of solar energy is small as in winter, or the water quality in the water area 1 is good, the phosphorus adsorption pumps 35 and 36 are not driven but only filtration pumps are driven. More specifically, impurities contained in water taken through the intake are removed by the filtration pump 31 or 33 first, and the water is then filtered by the filtration pump 32 or 34 on the last stage. The treated water is directly discharged into the water area 1 upon switching of a valve (not shown).

If the amount of solar energy is smaller, or the water quality in the water area 1 is better, only the filtration pump 31 or 33 on the first stage may be driven. In this case, water taken through the intake and filtered by the filtration pump 31 or 33 can be directly discharged into the water area 1 upon switching of a valve (not shown). Alternatively, only the filtration pump 32 or 34 on the last state may be driven. In this case, water from the intake can be taken into the filtration pump 32 or 34 on the last stage upon switching of a valve (not shown) to be filtered, and the filtered water can be directly discharged into the water area 1. Furthermore, when the water quality in the water area 1 is good, only the phosphorus adsorption pump 35 or 36 may be driven. In this case, water from the intake can be taken into the phosphorus adsorption pump 35 or 36 upon switching of a valve (not shown) to perform phosphorus adsorption, and the treated water can be discharged into the water area 1.

As described above, when the amount of solar energy is small, or the water quality in the water area 1 is good, the pumps 31 to 36 are independently driven to efficiently perform water purification in the water area 1.

Figure 7:
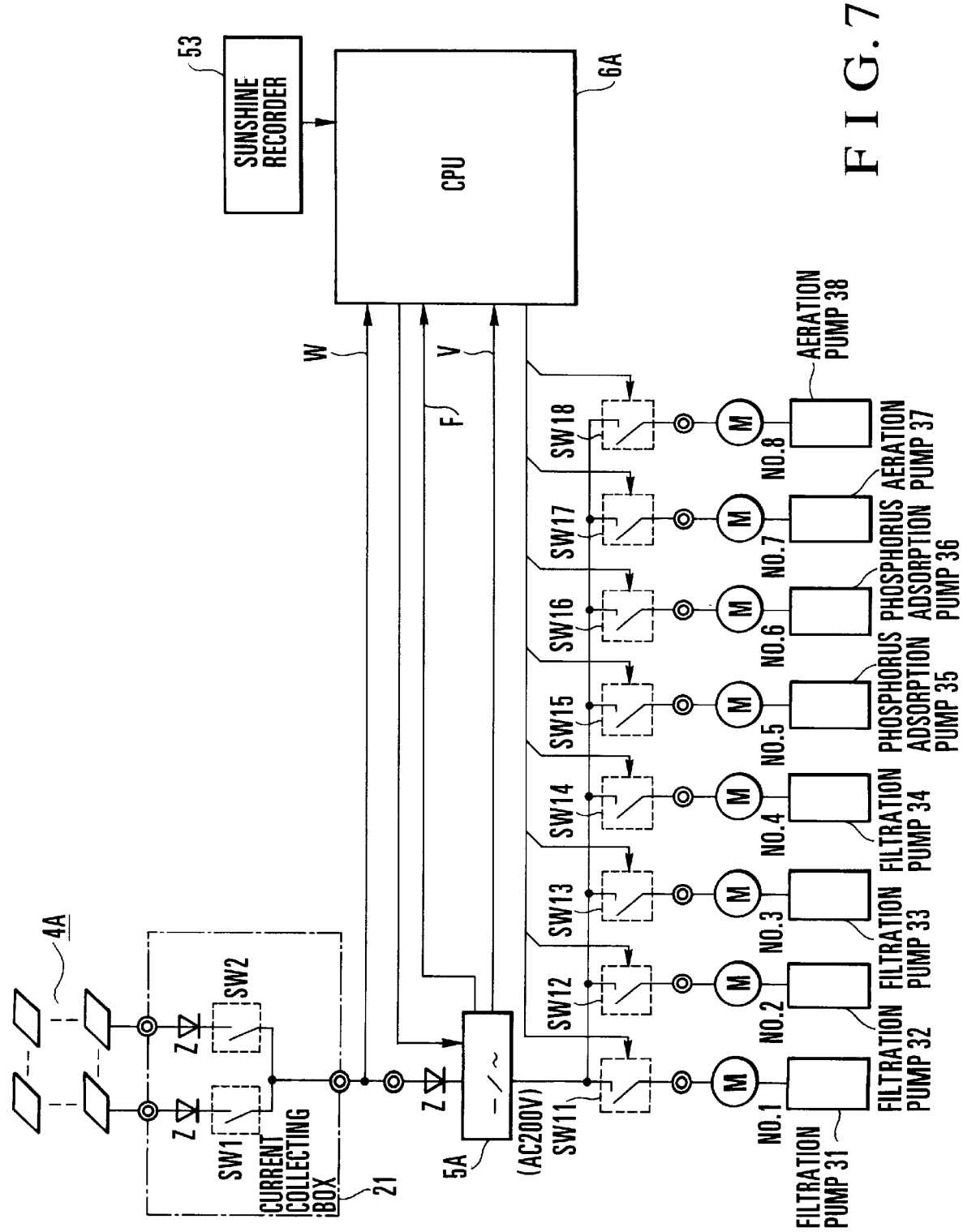
FIG. 7 is a block diagram showing the details of the main part of the apparatus in FIG. 6.

FIG. 7 shows the block diagram of the main part of the floating water purification free-running apparatus in FIG. 6. In this diagram, the pumps 31 to 38 of the water purification section 3 are driven to purify the water area 1 in accordance with the magnitude of power generated by the module 4A of the solar cell 4.

Referring to FIG. 7, power generated by the module 4A of the solar cell 4 is collected by the current collecting box 21 and converted into an AC voltage by the inverter 5A.

The output from the inverter 5A is supplied to the motors (M) NO. 1 to NO. 8 through the switches SW11 to SW18 to rotate the corresponding pumps, as described above.

The filtration pumps 31 to 34 are respectively connected to the motors NO. 1 to NO. 4, and the phosphorus adsorption pumps 35 and 36 are respectively connected to the motors NO. 5 and NO. 6. The aeration pumps 37 and 38 are respectively connected to the motors NO. 7 and NO. 8.

If power W generated by the module 4A of the solar cell 4 and collected by the current collecting box 21 becomes equal to or larger than a predetermined value, the CPU 6A independently closes the switches SW11 to SW18 on the basis of sunshine intensity information from the sunshine recorder 53, a voltage V from the inverter 5A, and an output frequency F, thereby independently driving the pumps 31 to 38 of the water purification section 3.

Third Method

Figure 8:
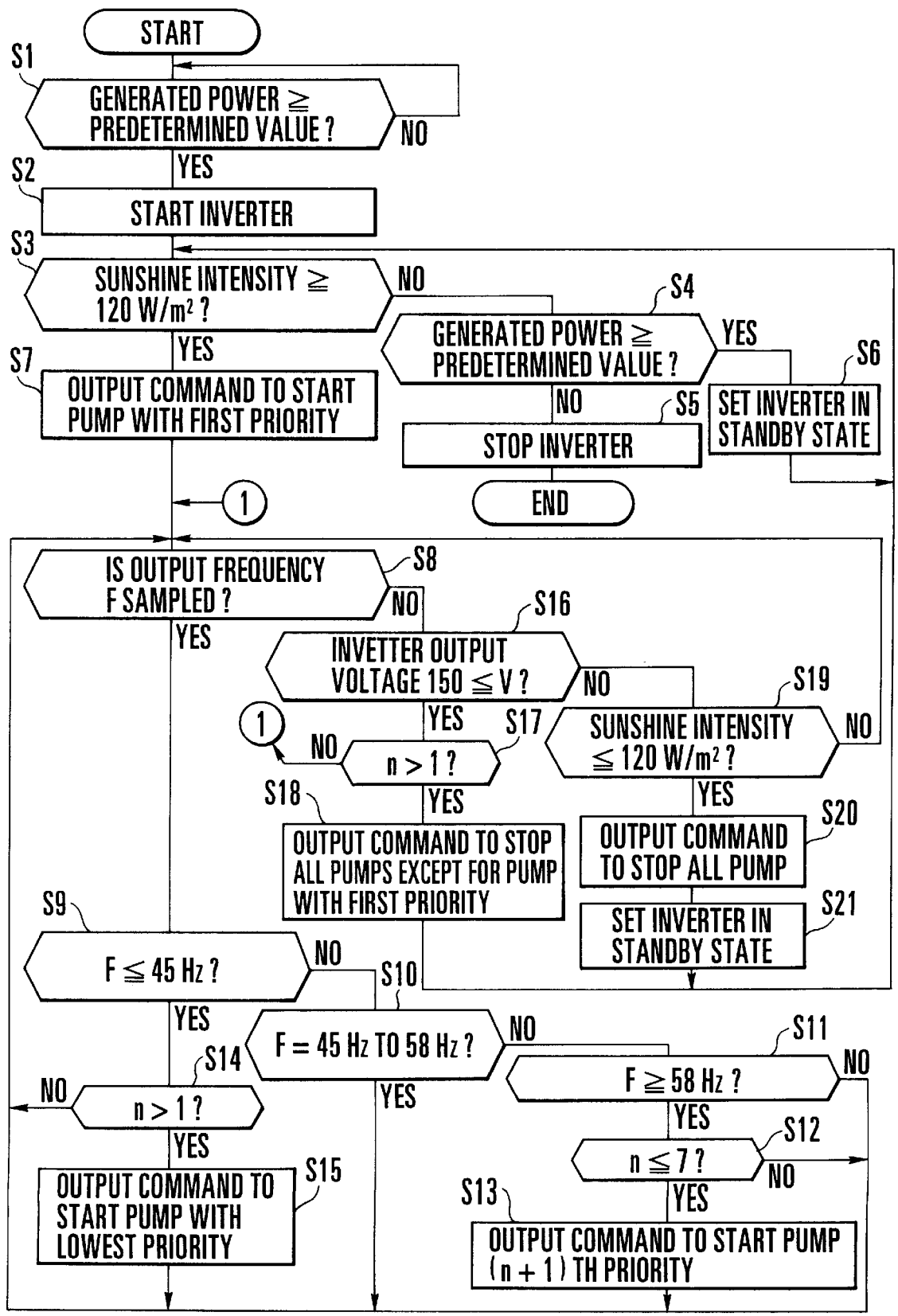
FIG. 8 is a flow chart showing the main operation of a control section of the apparatus.

In the third method, each motor M (NO. 1 to NO. 8) with high power consumption is driven in accordance with sunshine intensity information from the sunshine recorder 53 for measuring the intensity of sunlight, thereby performing water purification. This method will be described in detail with reference to the flow chart of FIG. 8.

When the switches SW3 to SW6 in FIG. 6 are closed, a DC voltage of 5 V from the module 4A or the battery 7 is applied to the CPU 6A through the inverter 5B. Upon reception of the power, the CPU 6A detects the power W generated by the module 4A and collected by the current collecting box 21 through the switches SW1 and SW2. The CPU 6A then determines in step S1 whether the generated power W is equal to or larger than the predetermined value. If the power generated by the module 4A is equal to or larger than the predetermined value, the CPU 6A starts the inverter 5A in step S2 to cause the inverter 5A to convert the DC power from the module 4A into an AC voltage.

In step S3, the CPU 6A reads information from the sunshine recorder 53 to check whether the sunshine intensity is equal to or higher than 120 W/m². If the sunshine intensity is lower than the above value, the CPU 6A detects power generated by the module 4A again in step S4 to check whether the generated power is equal to or larger than the predetermined value. If the power generated by the module 4A is smaller than the predetermined value, the CPU 6A stops the inverter 5A in step S5, thus terminating the processing. If the power generated by the module 4A is equal to or larger than the predetermined value, the CPU 6A keeps driving the inverter 5A (step S6), and the flow returns to step S3 to check whether the sunshine intensity is equal to or higher than 120 W/m².

If the sunshine intensity becomes equal to or higher than 120 W/m², the CPU 6A supplies, in step S7, a start command to the motor M that operates one of the pumps 31 to 38 in FIG. 7 to which the first priority is assigned.

Of the pumps 31 to 38 in FIG. 7, the aeration pumps 37 and 38 have the largest capacity. In this embodiment, since stable operation cannot be expected unless the aeration pumps 37 and 38 are started first, the first priority is assigned to the aeration pump 37, and the second to eighth priorities are respectively assigned to the aeration pump 38, the filtration pump 31, the filtration pump 32, the filtration pump 33, the filtration pump 34, the phosphorus adsorption pump 35, and the phosphorus adsorption pump 36. In step S7, therefore, the CPU 6A closes the switch SW17 to apply the AC voltage from the inverter 3 to the motor NO. 7 corresponding to the aeration pump 37, and supplies the start command to the motor NO. 7. As a result, the aeration pump 37 is driven to perform an aeration process of discharging air into the water in the water area 1.

In this state, the CPU 6A checks in step S8 whether the output frequency F of the AC voltage from the inverter 5A is sampled. If a sampling timing has come, and "Y" is obtained in step S8, the output frequency F of the inverter 5A is sampled, and the result is checked in steps S9, S10, and S11. In this case, the rated output frequency of the inverter 5A is 60 Hz, and the rated output frequency decreases below 60 Hz owing to the loads of the motors connected to the inverter. In addition, when the generated power supplied from the solar cell module 4A is small, the rated output frequency of the inverter 5A decreases below 60 Hz. For this reason, in this embodiment, the output frequency of the inverter 5A is periodically sampled, and the number of motors driven is controlled in accordance with the sampling result. In this embodiment, the output frequency is sampled 30 times in 10 sec.

If it is determined on the basis of the sampling result that the output frequency F of the inverter 5A has reached the rated frequency (maximum value), i.e., 60 Hz, "Y" is obtained in step S11 in which whether "F≦58 Hz" is determined. In this case, the pumps are sequentially started in the order of priorities.

If the output frequency F of the inverter 5A is kept equal to or higher than 58 Hz after the aeration pump 37 with the first priority is started, the CPU 6A checks in step S12 whether the number n of pumps started is equal to or smaller than 7. In step S13, the CPU 6A starts the aeration pump 38 (corresponding to the motor NO. 8) with the second priority. The flow then returns to step S8 to sample the output frequency F of the inverter 5A. If the output frequency F is still equal to or higher than 58 Hz, the CPU 6A checks in step S12 whether the number n of pumps started is equal to or smaller than 7. In step S13, the CPU 6A starts the filtration pump 31 (corresponding to the motor NO. 1) with the third priority. In this manner, while the output frequency F of the inverter 5A is kept equal to or higher than 58 Hz, the pumps are sequentially started up to the filtration pump 36 with the eighth priority. If the output frequency F of the inverter 5A is still kept equal to or higher than 58 Hz after all the eight pumps 31 to 38 are started, since "N" is obtained in step S12 in which whether "number n of pumps started≦7" is checked, the pump starting process is terminated.

After all the pumps 31 to 38 are started, or if the output frequency F of the inverter 5A becomes 45 to 58 Hz during the pump starting process, and "Y" is obtained in step S10, the pump start process is terminated.

As the power generated by the module 4A decreases with a decrease in sunshine intensity during the water purification process for the water area 1 after the pumps are started in this manner, the output frequency F of the inverter 5A also decreases. If the output frequency F becomes equal to or lower than 45 Hz, and "Y" is obtained in step S9, the CPU 6A sequentially stops the started pumps in order of increasing priorities in step S15 upon determining in step S14 that "Y" is obtained ("number n of pumps started>1", i.e., a plurality of motors are started). If the output frequency F of the inverter 5A becomes 45 to 58 Hz during this pump stopping process, and "Y" is obtained in step S10, the pump stopping process is terminated.

If the sampling timing for the output frequency F of the inverter 5A has not come, "N" is obtained in step S8. In this case, the CPU 6A determines the output voltage from the inverter 5A and the sunshine intensity information from the sunshine recorder 53 in steps S16 and S19, respectively.

Assume that as the sunshine intensity decreases, the power generated by the module 4A decreases, and the output voltage from the inverter 5A becomes equal to lower than 150 V, so that "Y" is obtained in step S16. In this case, upon determining in step S17 that a plurality of pumps are started, the CPU 6A stops all the started pumps except for the pump 37 with the first priority in step S18.

Assume that as the sunshine intensity decreases, the sunshine intensity information from the sunshine recorder 53 indicates 120 W/m$^2$ or lower, and "Y is obtained in step S19. In this case, the CPU 6A opens all the switches SW11 to SW18 to stop all the pumps 31 to 38 in step S20. Thereafter, the CPU 6A sets the inverter 5A in the standby state in step S21, and the flow returns to step S3.

As described above, the apparatus has the inverter 5A for converting generated power from the module 4A for performing solar power generation into an AC voltage, and applies the voltage as driving power to each of the pumps 31 to 38, and the CPU 6A controls the number of pumps (31 to 38) to be started on the basis of the output frequency F of the inverter 5A. In addition, the CPU 6A controls the number of pumps (31 to 38) to be started on the basis of the output voltage from the inverter 5A. Furthermore, the CPU 6A controls the number of pumps (31 to 38) to be started in accordance with the sunshine intensity information from the sunshine recorder 53. Moreover, the CPU 6A performs a starting process and a stopping process for the pumps 31 to 38 in accordance with the priorities assigned to the pumps 31 to 38.

As has been described above, according to the present invention, the water purification apparatus installed on the floating structure is driven by using electric energy self-generated from the solar cell, and the apparatus is moved on a water area by using drain energy obtained as secondary energy after water purification. Therefore, an increase in apparatus size can be prevented, and effective use of energy and energy saving can be realized. In addition, water purification can be performed throughout water areas.

What is claimed is:

1. A floating water purification free-running apparatus comprising:

a floating structure floating on a water area;

a water purification section which is mounted on said floating structure and filters water in the water area by using at least one of a plurality of first pumps;

a plurality of second pumps for injecting air into the water area;

a drain outlet which communicates with said water purification section to drain treated water purified by said water purification section;

a free-running section for moving said floating structure on the water area on the basis of a drain injection pressure from said drain outlet;

a water quality sensor which is provided as a measuring section to detect water quality in the water area;

a solar cell which is formed on an upper portion of said floating structure and receives sunlight to generate power;

an inverter for converting the power generated by said solar cell into an AC voltage and applying the voltage as driving power to each pump;

a sunshine recorder for measuring a sunshine intensity of sunlight; and a controller which is mounted on said floating structure, operates on the basis of the power generated by said solar cell, and controls the number of pumps to be driven on the basis of at least one of sunshine intensity information from said sunshine recorder and the AC voltage and output frequency of said inverter when making said water purification section perform water purification on the basis of an output from said water quality sensor.

2. An apparatus according to claim 1, wherein said apparatus further comprises a water purification section for adsorbing phosphorus contained in water in the water area by using at least one of a plurality of third pumps, and said controller controls the number of pumps to be driven, including said third pumps, on the basis of at least one of the sunshine intensity information from said sunshine recorder and the AC voltage and output frequency of said inverter when making said water purification section to perform water purification on the basis of the output from said water quality sensor.

3. An apparatus according to claim 2, wherein said controller drives said respective pumps in accordance with a predetermined priority order.

4. An apparatus according to claim 3, wherein said controller drives said pump with the first priority when a sunshine intensity measured by said sunshine recorder becomes not less than a predetermined value, sequentially drives said pumps in accordance with the priority order when the output frequency of said inverter is not less than a first value after said pump with the first priority is driven, keeps driving each pump that has already been driven when the output frequency of said inverter is not more than the first value and not less than a second value, and sequentially stops said pumps in operation in accordance with the priority order when the output frequency of said inverter becomes not more than the second value.

5. An apparatus according to claim 3, wherein said controller drives said pump with the first priority when a sunshine intensity measured by said sunshine recorder becomes not less than a predetermined value, sequentially drives said pumps in accordance with the output frequency of said inverter after said pump with the first priority is driven, and stops said pumps other than said pump with the first priority when an output voltage from said inverter becomes not more than a predetermined value.

6. An apparatus according to claim 2, wherein said drain outlet comprises a plurality of drain outlets arranged in radial directions, said free-running section comprises solenoid valves respectively arranged in said drain outlets to control drainage from said respective drain outlets, said measuring section comprises a plurality of infrared sensors arranged on an outer periphery of said floating structure to detect an obstacle in the water area, and said controller independently opens/closes each of said solenoid valves on the basis of an output from each of said infrared sensors to move said floating structure in the water area.

7. An apparatus according to claim 6, wherein said controller opens/closes each of said solenoid valves on the basis of an output from said water quality sensor so as to move said floating structure in the water area.

8. An apparatus according to claim 7, further comprising at least two of an azimuth measuring device for obtaining azimuth information about said floating structure, a speedometer for obtaining speed information about said floating structure, and a GPS signal receiver for obtaining position information about said floating structure as devices for obtaining information required to move said floating structure in the water area.

9. An apparatus according to claim 2, wherein said solar cell is formed on the upper portion of said floating structure in the form of a polyhedron.

10. An apparatus according to claim 2, wherein said apparatus further comprises a battery charged with power generated by said solar cell, and one of the power generated by said solar cell and power from said battery is supplied to said controller.

11. A water purification method using a floating structure floating on a water area, a water purification section which is mounted on said floating structure and filters water in the water area by using at least one of a plurality of first pumps, a plurality of second pumps for injecting air into the water area, a drain outlet which communicates with said water purification section to drain treated water purified by said water purification section, a free-running section for moving said floating structure on the water area on the basis of a drain injection pressure from said drain outlet, a solar cell which is formed on an upper portion of said floating structure and receive sunlight to generate power, an inverter for converting the power generated by said solar cell into an AC voltage and applying the voltage as driving power to each pump, and a sunshine recorder for measuring a sunshine intensity of sunlight, comprising the steps of:

driving a predetermined pump with a first priority when a sunshine intensity measured by said sunshine recorder becomes not less than a predetermined value;

sequentially driving said pumps in accordance with a predetermined priority order when an output frequency of said inverter is not less than a first value after said pump with the first priority is driven;

keeping driving each pump that has already been driven when the output frequency of said inverter is not more than the first value and not less than a second value; and sequentially stopping said pumps in operation in accordance with the priority order when the output frequency of said inverter becomes not more than the second value.

12. A method according to claim 11, using a water purification section for adsorbing phosphorus contained in water in the water area by using at least one of a plurality of third pumps, the method comprising the steps of:

driving a predetermined pump with a first priority when a sunshine intensity measured by said sunshine recorder becomes not less than a predetermined value;

sequentially driving said pumps in accordance with a predetermined priority order when an output frequency of said inverter is not less than a first value after said pump with the first priority is driven;

keeping driving each pump that has already been driven when the output frequency of said inverter is not more than the first value and not less than a second value; and sequentially stopping said pumps in operation in accordance with the priority order when the output frequency of said inverter becomes not more than the second value.

13. A method according to claim 12, further comprising the step of stopping said pumps other than said pump with the first priority when an output voltage from said inverter becomes not more than a predetermined value.

14. A method according to claim 12, further comprising the step of moving said floating structure in the water area by independently opening/closing solenoid valves respectively arranged in drain outlets in radial directions on the basis of outputs from a plurality of infrared sensors arranged on an outer periphery of said floating structure.

15. A method according to claim 14, further comprising the step of moving said floating structure in the water area by independently opening/closing each of said solenoid valves on the basis of an output from said water quality sensor.

16. A method according to claim 15, further comprising the step of moving said floating structure in the water area by independently opening/closing each of said solenoid valves on the basis of at least two pieces of information including azimuth information about said floating structure from an azimuth measuring device, speed information about said floating structure from a speedometer, and position information about said floating structure from a GPS signal receiver.

17. A method according to claim 16, further comprising the steps of:

calculating a difference distance to a predetermined target coordinate point upon reception of the position information from said GPS signal receiver, and calculating a moving distance per unit time upon reception of the speed information from said speedometer;

calculating a time required for movement to the target coordinate point on the basis of the calculated difference distance and the moving distance per unit time;

upon reception of an azimuth from said azimuth measuring device, calculating a first angle defined by the azimuth and a predetermined reference azimuth, and calculating a second angle defined by the reference azimuth and a target coordinate point; and controlling an opening/closing ratio and opening/closing time of each of said solenoid valves on the basis of the calculated moving time and the calculated first and second angles.

* * * * *

UNITED STATES PATENT AND TRADEMARK OFFICE
CERTIFICATE OF CORRECTION

PATENT NO. : 6,083,405
DATED : July 4, 2000
INVENTOR(S) : Tanaka et al

It is certified that error appears in the above-identified patent and that said Letters Patent is hereby corrected as shown below:

On title page,
In Assignee, Item [73], delete "Telegraphand" and insert -- Telegraph and --.

In References Cited, item [56], under Foreign Patent Documents, delete "295 07 659 U" and insert -- 295 07 659.3 U --.

Figure 11:
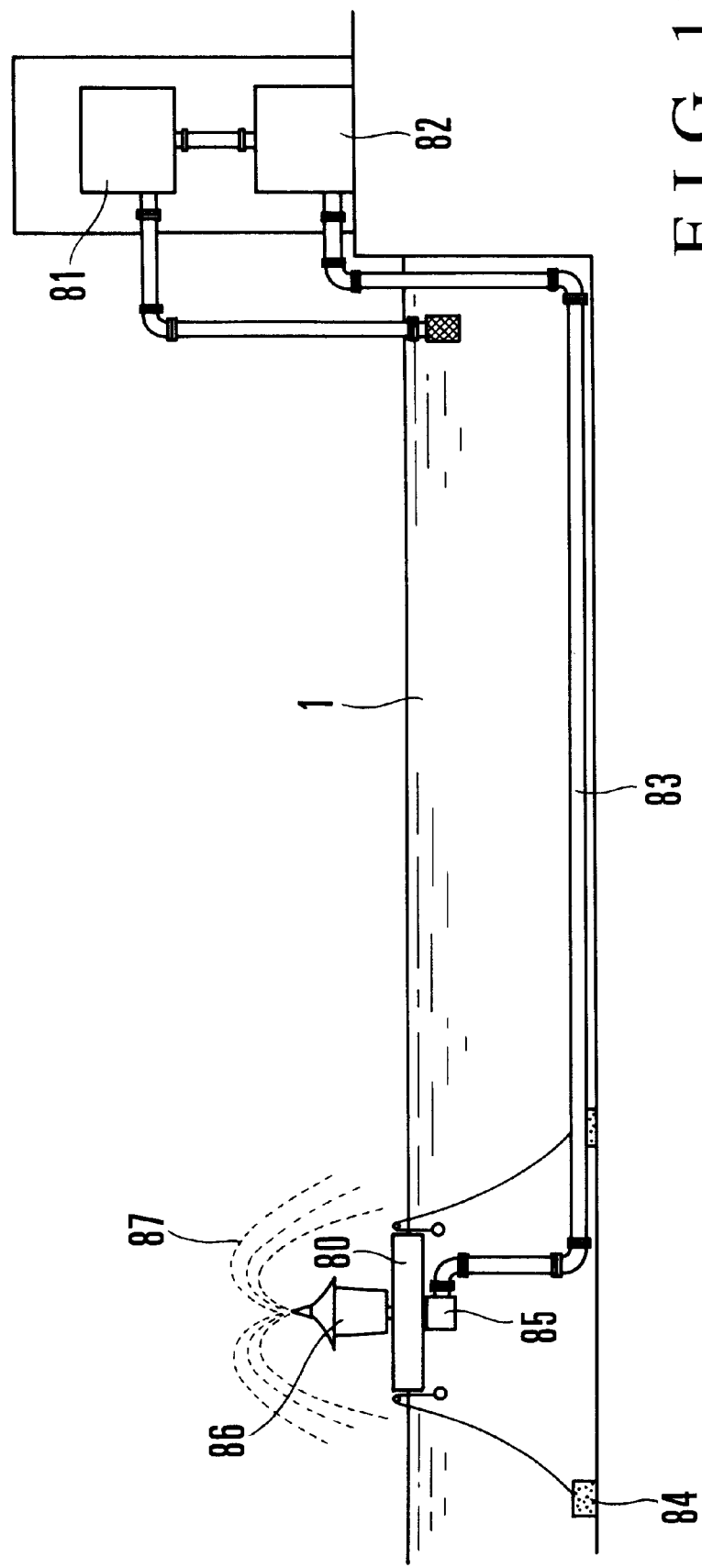
FIG. 11 is a view showing the schematic arrangement of a conventional water purification apparatus.

In the Drawing Sheets, at Figure 11, and under the designation "FIG. 11", insert -- (Prior Art) --.

Signed and Sealed this

Fifth Day of June, 2001

*Attest:*

*Attesting Officer*

NICHOLAS P. GODICI

*Acting Director of the United States Patent and Trademark Office*